No. 832,039. PATENTED OCT. 2, 1906.
E. D. CARR.
SOLID RUBBER TIRE.
APPLICATION FILED MAR. 6, 1905. RENEWED MAR. 10, 1906.
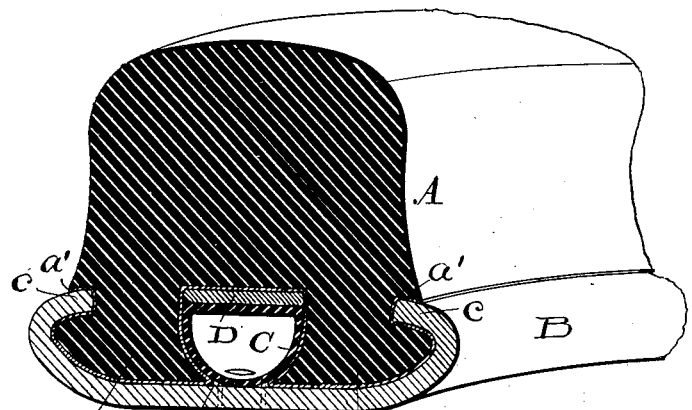
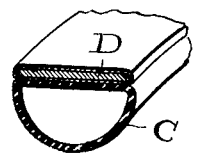
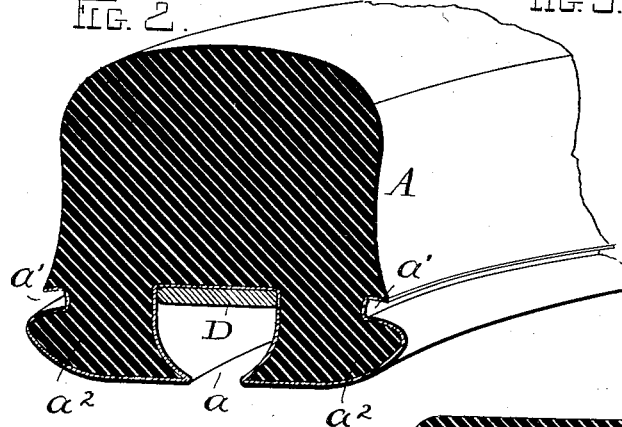
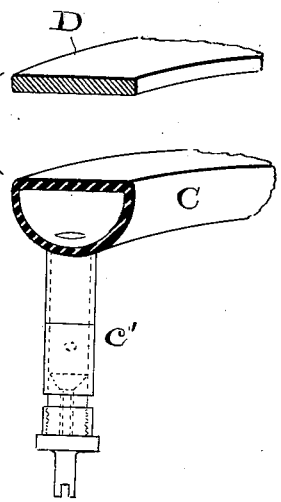
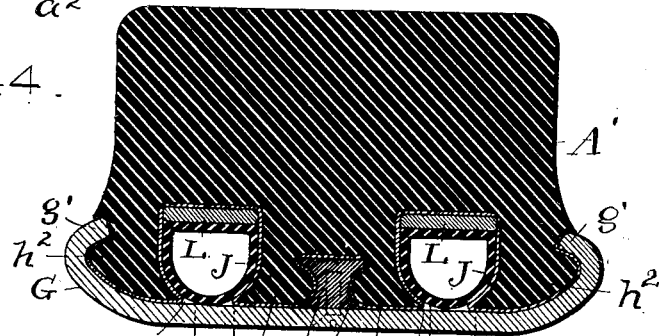
WITNESSES:
INVENTOR.
BY Edgar D. Carr
H. J. Fisher
ATTORNEY.

UNITED STATES PATENT OFFICE.

EDGAR D. CARR, OF AKRON, OHIO.

SOLID RUBBER TIRE.

No. 832,039.  Specification of Letters Patent.  Patented Oct. 2, 1906.

Application filed March 6, 1905. Renewed March 10, 1906. Serial No. 305,313.

*To all whom it may concern:*

Be it known that I, EDGAR D. CARR, a citizen of the United States, residing at Akron, in the county of Summit and State of Ohio, have invented certain new and useful Improvements in Solid Rubber Tires; and I do declare that the following is a full, clear, and exact description of the invention, which will enable others skilled in the art to which it appertains to make and use the same.

My invention consists in a solid rubber tire having a pneumatic grip and adapted especially for automobiles and other heavy vehicles. The tire thus constructed is shown as employed with a wheel which has what is known as a "clencher-rim," in or upon which the tire is immovably locked by a pneumatic tube, the base edges of the tire coming beneath the inturned edges of the rim, but at the same time leaving the tire to be easily removed from the rim when occasion arises for such change.

In detail the tire is constructed with an annular channel in its inner circumference where it fits upon the rim and which forms the base of the tire, and in said channel I place a pneumatic tube of a size and character adapted to force the sides of the tire or base into perfect locking engagement with the overhanging edges of the rim, all substantially as shown and described, and particularly pointed out in the claims.

In the accompanying drawings, Figure 1 is a perspective view of a portion of tire and associated parts in working position and with said parts in cross-section. Fig. 2 is a combined cross-section and perspective view of a portion of the tire alone. Fig. 3 shows perspective views cross-sectioned at the front of the pneumatic tube and the rim which comes over the same. Fig. 4 is a cross-section of a modification of tire for large vehicles and having two penumatic tubes locking the same on the rim. Fig. 5 is a combination of tube and rim.

In the construction of tires for automobiles and like heavy vehicles, in which the tire is liable to be subjected to excessive weight and severe side strain, it is first of all essential that the tire should be securely fastened to or upon the rim; otherwise there is constant danger to the vehicle and to the occupants, especially at high speeds and in short turns. It is also essential, or at any rate very desirable, that when it becomes necessary to remove the tire the change should be made easily and quickly and without damage to the tire or the means by which it is secured. This is particularly the case when a party is *en route* and substitution of a tire for some reason becomes imperative. Now my invention takes account of all these conditions and contingencies and comprises a solid rubber tire A, having an open channel $a$ in its base or inner circumference, a clencher-rim B of a well-known type with inwardly-turned side edges, a pneumatic rubber tube C, confined wholly within the said channel $a$, and an inelastic confining band or ring D about said tube C within said channel.

The tire A has side grooves or channels $a'$ in which the edges $c$ of the rim B engage, and beneath these at each side and constituting its base are distinct enlargements $a^2$, adapted to come beneath and within the sides of the said rim and hold the tire in place thereon. These enlargements of tire come at the sides of channel $a$, and the inflatable pneumatic tube C is adapted to be expanded, so as to crowd and compress or pack the said sides $a^2$ laterally beneath the sides of the rim as firmly as may be necessary to positively lock them therein. To this end said tube is provided with a nipple $c'$, whereby it can be inflated to any desired degree of firmness, and as the outer confining rim or ring D for said tube is inelastic there can be no expansion of said tube into the tread of the tire, and all expansion must be laterally where it is needed. The said band or ring D is preferably of a rigid material, such as iron or steel, and it lies in the bottom of channel $a$, which it is designed to fit and occupy. Pneumatic tube C comes next inside this band and when inflated flattens out against it and more or less spreads the sides of the base $a^2$ into the sides of the clencher-rim, thus producing a pneumatic grip which can be made as solid as the most extreme cases may require.

When the tube C is deflated, the tire can easily be disengaged from within the sides of the clencher-rim and rolled off at one side, because there is nothing to prevent collapsing the said sides $a^2$ of the base in channel $a$. This construction also greatly facilitates placing a new tire on the wheel.

In Fig. 4 I show a modification of the invention which is designed to be used only with unusually heavy vehicles, wherein a wide tire and rim are necessary. Hence in this instance I provide the rim G with a central or middle rib $g$, with channeled sides engaged in a corresponding channel $h'$ in the tire $A'$, and other channels $h$ are provided corresponding to channels $a$ in Figs. 1 and 2. Pneumatic tubes J are used herein the same as tubes C, and the base portions $h^2$ and $h^3$ are locked beneath the edges $g'$ of rim G and against rib $g$ by the inflation of tubes J. There are also rims or rings L in the bottom of channels $h$, as in Figs. 1 and 2.

Fig. 5 shows a modification in which the pneumatic tube and the rim D are united, so as to handle them together, and to this end rim D is incased in sheaths of canvas or cloth and cemented to said tube. This makes the two one article to the trade, and the combination is especially desirable for the lighter classes of vehicles.

It will be noticed that in all cases the inturned edges of the rim are on a plane substantially with the base of the channel carrying band D and expansion locking-tube C, so that the tire is narrowed between these two points and a very effectual lock for the tire is formed. The same principle substantially obtains in Fig. 4.

The chief advantages of a tire constructed as thus described and shown are, first, that by having the annular inner channel or channels in the base of the tire and the pneumatic tube therein to secure the tire it is possible to easily release the tire simply by deflating the tube. This affords room for crowding the sides of the base inward, so as to roll the tire off at one side, and this is particularly essential because the tire is otherwise of solid rubber, and there cannot, therefore, be any yielding or springing of the tire outward away from the rim, as would be possible if the tire were of the well-known tubular pneumatic kind. In other words, a solid tire demands a construction like this with a clencher-rim, as otherwise it cannot be disengaged. In the second place, this construction of tire has the very important advantage of bringing a mechanical pressure to bear upon the tire-securing mechanism at the tread at the time when the greatest strain comes thereon, as when a short turn is made in a road and the tendency is to strip the tire from the wheel. Then the solid rubber tread with the weight of the load upon it acts mechanically directly at the spot where pressure is needed to help the clenching and spreading mechanism to hold the tire on, and said mechanism is directly and greatly reinforced by the solid tire pressing on the pneumatic tube and causing increased strength of side engagement with the rim, and thus effectually holding the tire on the wheel.

What I claim is—

1. A solid rubber tire having an endless open channel in its base and grooves along each side over and above the sides of said base, in combination with a clencher-rim having inturned edges engaged in said grooves, and an expansible pneumatic tube in said channel adapted to spread the base of the tire laterally in the rim and thereby hold the tire in working position.

2. A solid rubber tire adapted to be locked in place by pneumatic pressure, said tire having a channel about its inner circumference, an inelastic band in the bottom of said channel, a pneumatic tube within said channel bearing against said band and the sides of said channel, and a rim carrying said tire having inturned edges engaging in the sides of the tire.

3. In vehicle-tires, a tire having a yielding body and a base provided with a continuous channel centrally thereof, said channel open at its bottom, and said tire solid over said channel, an expansible pneumatic tube in said channel adapted to spread the divided sides of the said base laterally, and a rim carrying the said tire and tube having its edges engaged over the outer edges of said base, whereby a mechanical force is applied through the tread of the tire to help hold it on the rim.

In testimony whereof I sign this specification in the presence of two witnesses.

EDGAR D. CARR.

Witnesses:
R. B. MOSER,
C. A. SELL.